(12) United States Patent
Matsuoka et al.

(10) Patent No.: US 8,348,803 B2
(45) Date of Patent: Jan. 8, 2013

(54) PLANETARY REDUCTION GEAR APPARATUS

(75) Inventors: Tetsuya Matsuoka, Kobe (JP); Hiroyasu Nishikawa, Kobe (JP); Tooru Nishida, Akashi (JP); Hirofumi Akahori, Akashi (JP); Tatsuhiko Goi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 520 days.

(21) Appl. No.: 12/588,291

(22) Filed: Oct. 9, 2009

(65) Prior Publication Data
US 2010/0261571 A1    Oct. 14, 2010

(30) Foreign Application Priority Data

Apr. 14, 2009   (JP) .................................. 2009-097981

(51) Int. Cl.
*F16H 57/08*   (2006.01)
(52) U.S. Cl. ........................................ 475/331; 475/346
(58) Field of Classification Search .................. 475/331, 475/346, 347
See application file for complete search history.

(56) References Cited

U.S. PATENT DOCUMENTS

| | | | | |
|---|---|---|---|---|
| 3,943,787 | A * | 3/1976 | Hicks | 74/410 |
| 5,466,198 | A | 11/1995 | McKibbin et al. | |
| 6,409,414 | B1 * | 6/2002 | Altamura et al. | 403/284 |
| 2003/0008748 | A1 * | 1/2003 | Fox | 475/346 |
| 2005/0026744 | A1 | 2/2005 | Illerhaus | |

FOREIGN PATENT DOCUMENTS

| | | |
|---|---|---|
| EP | 0003894 A1 * | 9/1979 |
| EP | 1 028 275 A2 | 8/2000 |
| EP | 1 783 344 A1 | 5/2007 |
| JP | A-4-53 | 1/1992 |
| JP | A-6-10994 | 1/1994 |
| JP | U-6-47764 | 6/1994 |
| JP | A-7-208587 | 8/1995 |
| JP | A-2000-46159 | 2/2000 |
| JP | A-2000-274515 | 10/2000 |
| JP | A-2001-108027 | 4/2001 |
| JP | A-2005-48950 | 2/2005 |
| WO | WO 2009083657 A1 * | 7/2009 |

OTHER PUBLICATIONS

European Search Report dated Apr. 13, 2011 issued in European Patent Application No. 09173283.4.
Japanese Office Action dated Mar. 16, 2010 issued in Japanese Patent Application No. 2009-097981 (with translation).

* cited by examiner

*Primary Examiner* — Tisha Lewis
(74) *Attorney, Agent, or Firm* — Oliff & Berridge, PLC (57) ABSTRACT

A planetary reduction gear apparatus has a sun gear having external teeth; planetary gears, each having external teeth and configured to be meshed with the sun gear; planetary shafts, each being a rotation shaft of the planetary gear; a ring gear having internal teeth and configured to be meshed with the planetary gears; and a planetary carrier including an annular base plate and an annular back plate. The planetary carrier supports the planetary shafts between the annular base plate and the annular back plate and determines a relative position between planetary gears. The annular base plate is integrally formed with one end of the planetary shaft to support the one end. The annular back plate supports the other end of the planetary shaft. At least one of the planetary shaft and the planetary carrier has lower stiffness in its part adjacent to the one end of the planetary shaft than stiffness of its part adjacent to the other end thereof.

7 Claims, 9 Drawing Sheets

PLANETARY REDUCTION GEAR APPARATUS

CROSS REFERENCE TO RELATED APPLICATIONS

This application is based upon the prior Japanese Patent Applications No. 2008-107971 filed on Apr. 17, 2008 and No. 2009-097981 filed on Apr. 14, 2009, the entire contents of which are incorporated herein by reference.

TECHNICAL FIELD

The present invention relates to a planetary reduction gear apparatus used in particular for a power transmission mechanism for an aircraft.

BACKGROUND ART

Conventionally, the planetary reduction gear apparatus of this type includes a sun gear having external teeth, a plurality of planetary gears, each having external teeth and configured to be meshed with the sun gear, a common planet carrier adapted for supporting a rotation shaft of each planetary gear and configured to determine a relative position between each adjacent planetary gears, and a ring gear having internal teeth and configured to be meshed with the planetary gears. In this gear system, power generated from a power source, such as a gas turbine engine or the like, is first inputted to the sun gear, and then transmitted to each planetary gear. Thereafter, the power transmitted to the planetary gears can be outputted as two kinds of different powers. One is a rotation power generated by rotation of each planetary gear around its axis and used for rotating the ring gear. The other is a rotation power generated by revolution of the planetary gears around the sun gear and used for rotating the planetary carrier (e.g., see U.S. Pat. No. 5,466,498).

During operation of an aircraft provided with the aforementioned conventional planetary reduction gear apparatus, each planetary shaft, i.e., the rotation shaft of each planetary gear, may tend to be bent and deformed by effect of driving torque applied to the planetary carrier. With such bending deformation, misalignment, i.e., deterioration of parallelism, between each planetary gear and the sun gear and ring gear respectively meshed with the planetary gear, will occur. Further, with such misalignment, unbalanced contact between the gears and/or bearings will be likely to occur, leading to substantial deterioration of the life span of the planetary reduction gear apparatus.

Therefore, it is an object of the present invention to provide a new planetary reduction gear apparatus which can successfully reduce the occurrence of the misalignment caused by the bending deformation of each planetary shaft so as to ensure an adequate life span thereof.

SUMMARY OF THE INVENTION

In order to achieve the above object, the present invention provides a planetary reduction gear apparatus including: a sun gear having external teeth; a plurality of planetary gears, each of the planetary gears having external teeth and being configured to be meshed with the sun gear; a plurality of planetary shafts, each of the planetary shafts being a rotation shaft of each of the planetary gears; a ring gear having internal teeth and configured to be meshed with the planetary gears; and a planetary carrier including an annular base plate and an annular back plate, the planetary carrier being configured to support the planetary shafts between the annular base plate and the annular back plate and determine a relative position between planetary gears, the annular base plate being integrally formed with one end of the planetary shaft so as to support the one end, the annular back plate being configured to support an other end of the planetary shaft, wherein at least one of the planetary shaft and the planetary carrier has a lower stiffness in its part adjacent to the one end of the planetary shaft than a stiffness of its part adjacent to the other end of the planetary shaft.

With the aforementioned configuration, bending deformation of each planetary shaft can be successfully restrained due to the lowered stiffness of the part adjacent to the one end of the planetary shaft. Particularly, the stiffness of the part of the base plate adjacent to the one end of the planetary shaft may be lowered relative to the stiffness of the back plate. Thus, unwanted displacement or deformation of the planetary shaft can be effectively suppressed. Therefore, misalignment between the planetary gear supported by each corresponding planetary shaft and the sun gear as well as misalignment between the planetary gear and the ring gear can be securely suppressed, thereby significantly improving the life span of the planetary reduction gear apparatus.

In the planetary reduction gear apparatus according to this invention, it is preferred that an amount of material in the part of the planetary shaft or the planetary carrier adjacent to the one end of the planetary shaft is reduced. With such configuration, the stiffness of the part of the planetary shaft or the planetary carrier adjacent to the one end of the planetary shaft can be effectively reduced with only a simple modification of the conventional planetary reduction gear apparatus. Thus, the aforementioned misalignment can be significantly suppressed, as well as the weight of the planetary reduction gear apparatus can be securely decreased.

As one exemplary structure for reducing the amount of material as described above, an axially extending through-hole (or through-holes) may be formed in the base plate. With such through-holes, the stiffness of the base plate can be positively reduced with a relatively simple structure, as well as substantial decrease of the weight of the planetary reduction gear apparatus can be achieved.

For instance, in the case of forming such an axially extending through-hole in the base plate, the base plate and back plate may be coupled with each other, via an axially extending hollow carrier post (or posts), wherein the aforementioned axially extending through-hole may be formed in a portion of the base plate facing a hollow portion of the carrier post. With such configuration, the weight of the planetary reduction gear apparatus can be effectively reduced, without unduly decreasing the stiffness of the base plate.

As one exemplary structure for reducing the weight of the planetary reduction gear apparatus, each planetary shaft may be formed into a hollow shaft, wherein a diametrically extending through-hole (or through-holes) may be provided at the part adjacent to the one end of the planetary shaft. With such configuration, the stiffness of the part of the planetary shaft adjacent to the one end of the planetary shaft can be reduced with a considerably simple structure, as well as the weight of the planetary reduction gear apparatus can be substantially decreased.

In the case of providing the diametrically extending through-hole at the part of the planetary shaft adjacent to the one end thereof, it is preferred that such a through-hole is opened in a radial direction with respect to an axis of the sun gear. In this case, the radial direction with respect to the axis of the sun gear is substantially coincident with a neutral axis of the bending deformation of each planetary shaft. Thus, the weight of the planetary reduction gear apparatus can be effectively decreased, without unduly reducing the stiffness of each planetary shaft.

In the planetary reduction gear apparatus according to this invention, it is preferred that a ratio Y1/Y2, which is defined as a ratio between a Young's modulus Y1 in the part adjacent to the one end of the planetary shaft and a Young's modulus Y2 in the part adjacent to the other end of the planetary shaft, is set within a range of 0.01 to 0.5. By setting the ratio between the two Young's moduli within such a range, the occurrence of misalignment can be reduced more effectively.

As described above, according to the planetary reduction gear apparatus of this invention, the occurrence of misalignment can be effectively reduced with a simple structure, as well as the life span thereof can be significantly improved.

BRIEF DESCRIPTION OF THE DRAWINGS

The above and other objects, features and advantages of the present invention will become more apparent from the following description taken in connection with the accompanying drawings, in which.

DESCRIPTION OF EMBODIMENTS

Hereinafter, preferred embodiments of the present invention will be described, with reference to the drawings.

Figure 1:
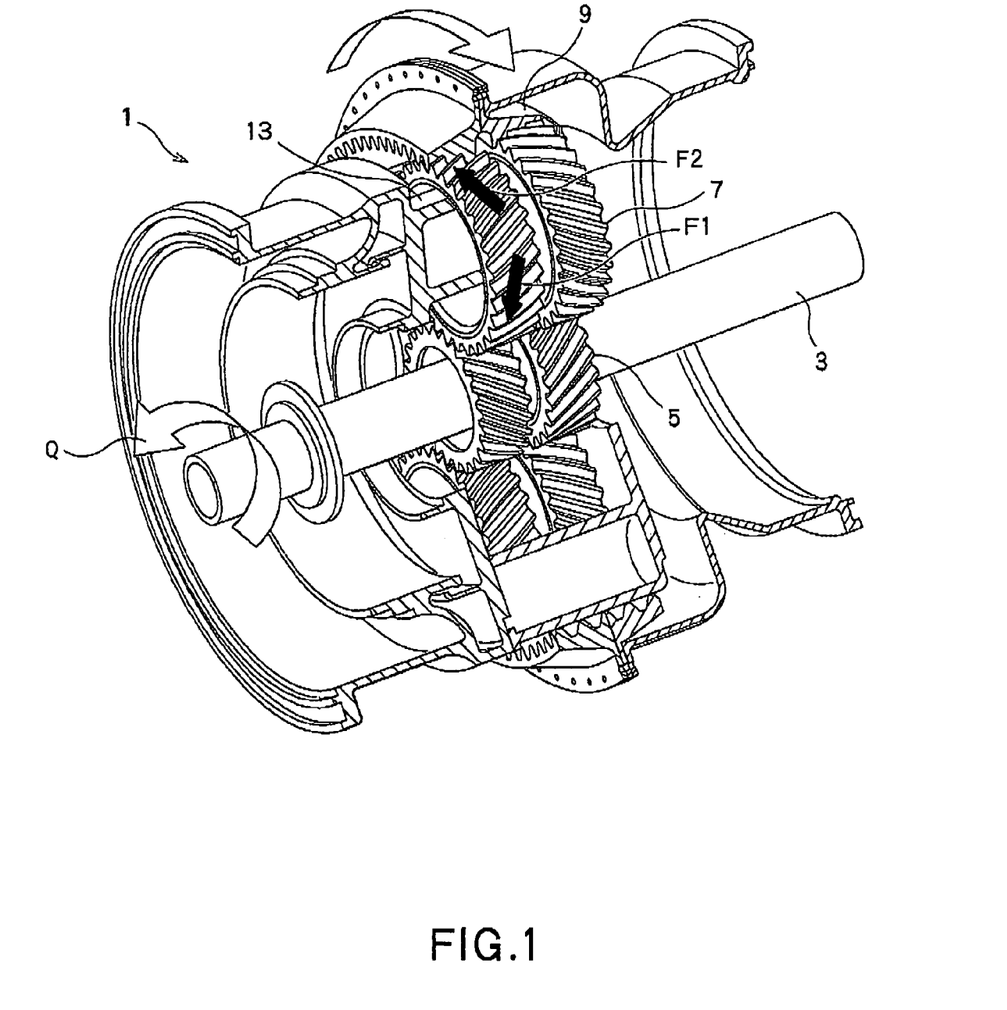
FIG. 1 is a partly cut away perspective view showing a planetary reduction gear apparatus according to a first embodiment of the present invention.

Referring to FIG. 1 showing the planetary reduction gear apparatus 1 of the first embodiment of the present invention, the planetary reduction gear apparatus 1 is provided in, for example, an airplane or helicopter, while being connected with a gas turbine engine (not shown) via an input shaft 3. In this case, the power outputted from the gas turbine engine will be transmitted via the apparatus to two rotors (not shown), independently, as two kinds of different power. As used herein, one side, in an axial direction, on which the gas turbine engine is located (i.e., a left lower side in FIG. 1), will be referred to as "a front side", while the other side will be referred to "a back side."

Figure 2:
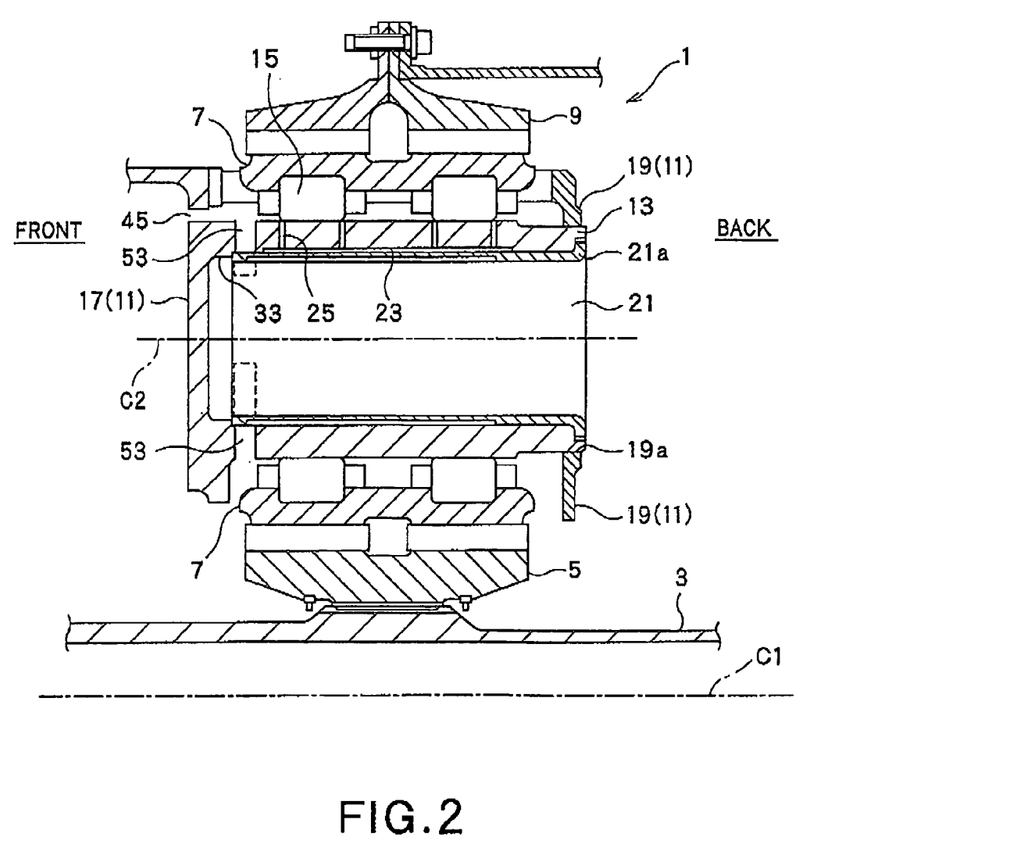
FIG. 2 is a longitudinal section of the planetary reduction gear apparatus shown in FIG. 1.

FIG. 2 is a longitudinal section of the planetary reduction gear apparatus 1 shown in FIG. 1. As shown in FIG. 2, the planetary reduction gear apparatus 1 has a multiple-row gear mechanism, including a sun gear 5, planetary gears 7, a ring gear 9, a planetary carrier 11 and planetary shafts 13. The sun gear 5 has external teeth composed of multiple rows of helical gears, with one row of the helical gears being inclined in a reverse direction to the other row thereof. The sun gear 5 is fitted around the input shaft 3. Similarly, each planetary gear 7 has the external teeth composed of multiple rows of the helical gears, with each row of the helical gears of the planetary gear 7 provided corresponding to the sun gear 5. Specifically, each planetary gear 7 is meshed with the sun gear 5, while being rotatably attached around an outer circumference of one hollow planetary shaft 13, which is used as a rotation shaft, via multiple rows of bearings 15. In this embodiment, as will be detailed later, four planetary gears 7 are arranged, at an equal interval, along an outer circumference of the sun gear 5. Each planetary shaft 13 of the four planetary gears 7 has a front end integrally formed with an annular base plate 17 having the same axis C1 as that of the input shaft 3. Meanwhile, a back end of each planetary shaft 13 is fitted in a corresponding hole 19a of an annular back plate 19 provided to have the same axis as that of the base plate 17.

A cylindrical collar 21 having a rib 21a provided at one axial end thereof is inserted and fitted along an inner circumferential face of each hollow planetary shaft 13, with an oil passage 23 provided, as a gap, between an outer circumference of the collar 21 and a recess formed in an axially central portion of the inner circumferential face of the planetary shaft 13. From the oil passage 23, oil is supplied to each bearing 15, via oil supply passages 25 each extending through a wall of the planetary shaft 13. The back plate 19 is fixedly coupled with the base plate 17, as will be detailed later, by means of multiple bolts, via a plurality of posts arranged between the back plate 19 and the base plate 17. In this manner, the base plate 17 and the back plate 19, coupled with each other by means of the bolts via the posts, constitute together the planetary carrier 11 for supporting the planetary shafts 13 and planetary gears 7. As such, a relative position between each adjacent planetary shafts 13, i.e., the relative position between each adjacent planetary gears 7, can be determined by the planetary carrier 11. The ring gear 9 includes internal teeth composed of multiple rows of the helical gears, and is configured to be meshed with the four planetary gears 7.

The power generated by revolution of the four planetary gears 7 around the axis C1 is outputted to a front rotor (not shown) located on the front side, as driving force, via a front output shaft having the same axis as that of the input shaft 3. Meanwhile, the outer circumference of the ring gear 9 includes a back end portion connected with a back output shaft provided to have the same axis as that of the input shaft 3. As such, the power generated by rotation of each planetary gear 7 on its axis C2 can be outputted to a back rotor (not shown) located on the back side, as the driving force, via the ring gear 9. It is noted that the power may be outputted only in one direction of the front and back directions, either by setting the ring gear 9 non-rotatable or by setting the planetary carrier 11 non-rotatable.

Figure 3:
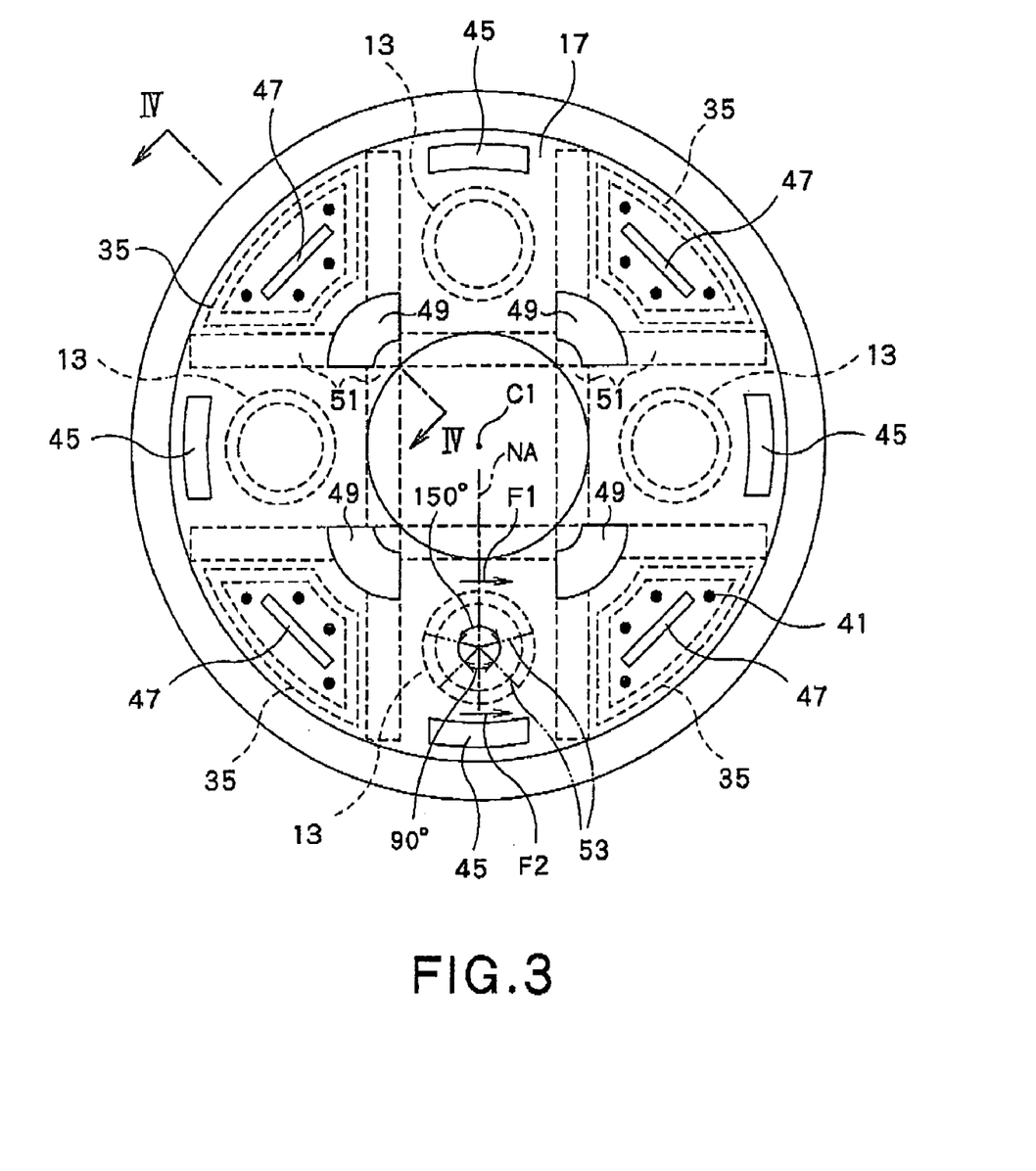
FIG. 3 is a front view of a base plate provided in the planetary reduction gear apparatus shown in FIG. 1.
Figure 4:
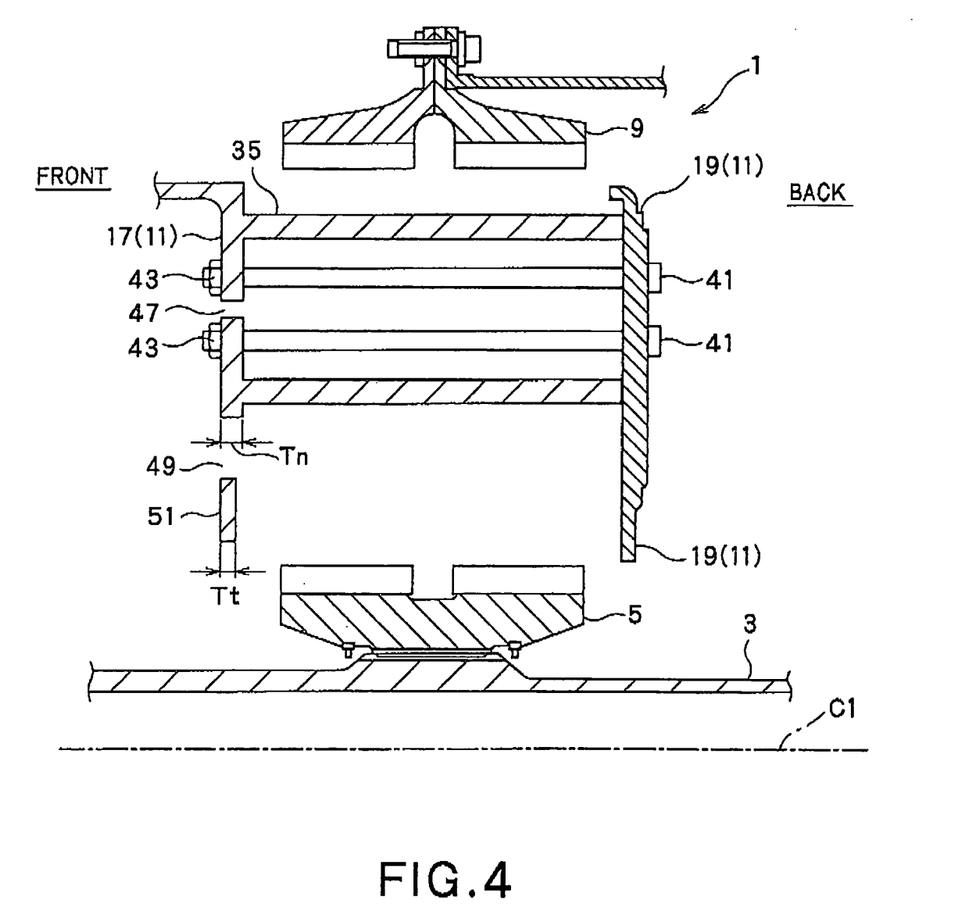
FIG. 4 is a section taken along line IV-IV shown in FIG. 3.

FIG. 3 is a front view of the base plate 17 provided in the planetary reduction gear apparatus 1 shown in FIG. 1. The four planetary shafts 13 are arranged, at an equal interval, in the circumferential direction, relative to the base plate 17. Further, as shown in FIG. 4, a section taken along line IV-IV shown in FIG. 3, four carrier posts 35 are integrally formed with the base plate 17, while being arranged between each adjacent planetary shafts 13, at an equal interval, in the circumferential direction of the base plate 17.

As shown in FIG. 3, several kinds of axial through-holes respectively having different positions and shapes are formed in the base plate 17. More specifically, the base plate 17 has outer through-holes 45, each positioned outer than each corresponding planetary shaft 13 in a diametrical direction of the base plate 17, post through-holes 47, each axially extending through a hollow portion of each corresponding carrier post 35, and inner through-holes 49, each positioned inner than each corresponding carrier post 35 in the diametrical direction. On a back side of the base plate 17, thin-walled portions 51 are provided, as lattice-like grooves, while crossing each other in positions approximately corresponding to the four inner through-holes 49. Each thin-walled portion 51 shown in FIG. 4 may have any suitable thickness Tt. In this embodiment, however, this thickness Tt is set at about three fourths of the thickness Tn of the other portion of the base plate 17.

Now returning to FIG. 2, a shaft-proximal-end through-hole 53, partly running along the circumference of each planetary shaft 13 and extending in the diametrical direction, is provided at a shaft-proximal-end portion 33 that is one end of the planetary shaft 13 integrally formed with the base plate 17. Meanwhile, in the axial direction, each shaft-proximal-end through-hole 53 is provided to extend within a range that will not interfere with an orbital plane of the nearest bearing 15. Furthermore, along the circumferential direction of each corresponding planetary shaft 13, as depicted by dotted lines in FIG. 3 (for convenience, only one representative shaft-proximal-end through-hole 53 is shown in the drawing), each through-hole 53 is provided to run, diametrically outside, in the base plate 17, within a range of, for example, a central angle 90°, while being provided to run, diametrically inside, in the base plate 17, within a range of, for example, a central angle 150°. Generally, each planetary shaft 13 may tend to be bent and deformed by driving force F1, F2 respectively applied to each corresponding planetary gear 7. In this embodiment, however, a neutral axis NA of such bending deformation is approximately coincident with the radial direction with respect to the axis C1 of the input shaft 3. Therefore, even though the through-hole 53 having a relatively large size is provided in the vicinity of each neutral axis NA in order to reduce the total weight, the stiffness of the corresponding planetary shaft 13 will not be unduly lowered. In other words, with the provision of such shaft-proximal-end through-holes 53, each provided to be arranged in the radial direction with respect to the axis C1 of the sun gear 5, the weight of the planetary reduction gear apparatus 1 can be effectively decreased, without unduly lowering the stiffness of each corresponding planetary shaft 13.

Each carrier post 35 has a lateral section of a substantially isosceles trapezoid that is tapered toward the axis C1, and is a hollow member integrally formed with the base plate 17. As shown in FIG. 4, the back plate 19 is fixedly fastened to the base plate 17, by means of a plurality of bolts 41 and nuts 43 (in this embodiment, four bolts 41 and four nuts 43 are used, respectively), each extending through the back plate 19, hollow portion of each carrier post 35 and base plate 17, while a distal end face of the carrier post 35 is vertically pressed against the back plate 19. However, it is also contemplated that the base plate 17, back plate 19 and carrier posts 35 may be formed integrally relative to one another.

According to the planetary reduction gear apparatus 1 according to the above first embodiment, the following effects can be obtained.

Figure 9:
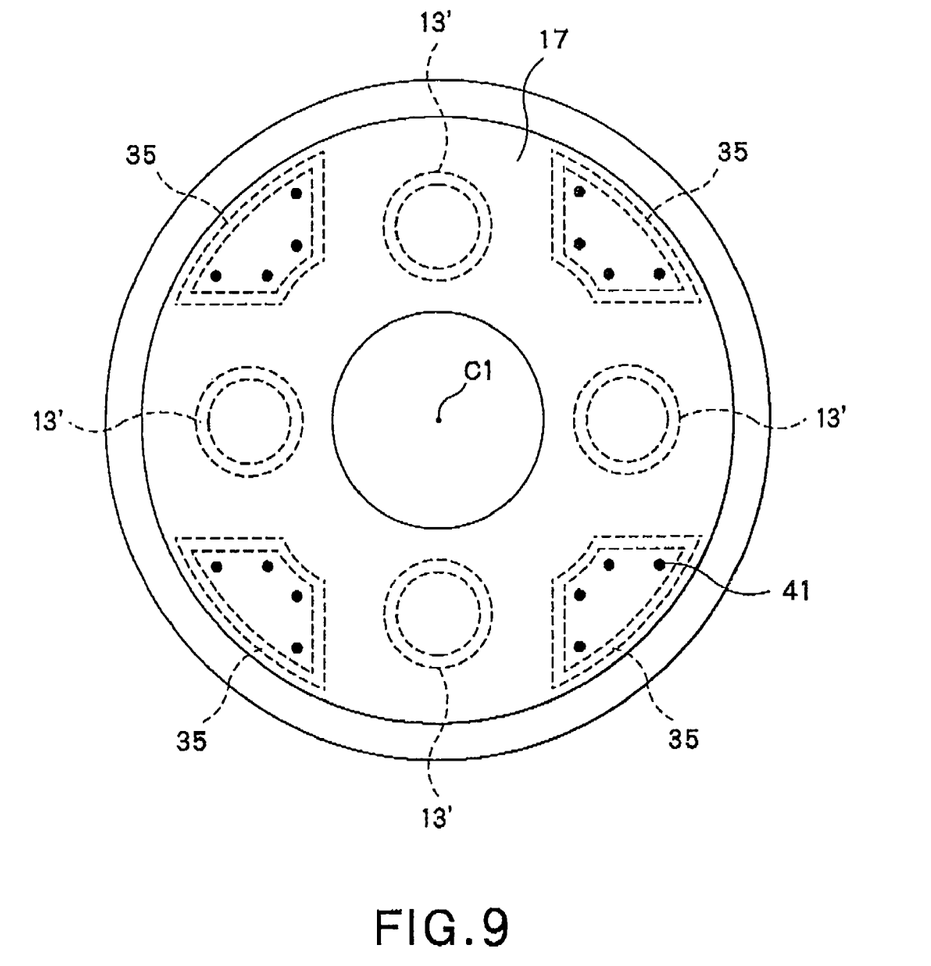
FIG. 9 is a front view showing a base plate provided in a conventional planetary reduction gear apparatus.

During operation of the helicopter provided with the planetary reduction gear apparatus 1 shown in FIG. 1, the input shaft 3 is rotated in a direction depicted by an arrow Q, while the driving force of the sun gear 5 fitted around the input shaft 3 is applied to each planetary gear 7 in a direction depicted by the arrow F1. Thereafter, when the driving force applied to each planetary gear 7 is transmitted to the ring gear 9, counter force against the driving force will be applied to the planetary gear 7 in a direction depicted by the arrow F2. Since the direction F1 is parallel with the direction F2, the bending deformation occurs in each planetary shaft 13. By the way, in the case of the conventional planetary reduction gear apparatus including the base plate as shown in FIG. 9, the parallelism between axial directions of the respective planetary shafts 13' tends to be deteriorated by the bending deformation of the planetary carrier, resulting in misalignment between each planetary gear and the other gears. However, in the first embodiment as shown in FIG. 3, due to the provision of the through-holes 45, 47, 49 in the base plate 17, the thin-walled portions 51 on the back side of the base plate 17 and the shaft-proximal-end through-hole 53 at the shaft-proximal-end portion 33 of each planetary shaft 13, the stiffness in the vicinity of the base plate 17 and/or shaft-proximal-end portions 33 can be successfully reduced, thus rendering them adequately flexible.

As such, the bending deformation of each planetary shaft 13 can be adequately suppressed, thereby significantly reducing the misalignment between each planetary gear 7 and the sun gear 5 as well as reducing the misalignment between the planetary gear 7 and the ring gear 9, without unduly deteriorating the parallelism of each planetary shaft 13 relative to the axis C1. Namely, with the provision of the through-holes and/or thin-walled portions to the base plate 17 coupled with the front output shaft as well as to the shaft-proximal-end portions 33 respectively located on the side of the base plate 17, the amount of materials used for forming these members can be substantially reduced, while successfully reducing the stiffness of such members. Therefore, the misalignment between each planetary gear 7 and the gear 5 and/or 9 meshed with the planetary gear 7 can be mitigated or substantially eliminated, thus securely improving the life span of the planetary reduction gear apparatus 1. Besides, since such effects can be obtained with a simple structure as described above, there is no need for a great change of design and/or undue increase of the production cost.

Additionally, with the provision of such through-holes 45, 47, 49, 53 and thin-walled portions 51, as described above, to the base plate 17 and/or shaft-proximal-end portions 33, the stiffness of the base plate 17 and/or shaft-proximal-end portions 33 can be reduced, while successfully suppressing the misalignment, as well as the weight of the planetary reduction gear apparatus 1 can be securely decreased. In particular, the post through-holes 47 can serve to positively decrease the weight of the planetary reduction gear apparatus 1, without unduly deteriorating the stiffness of the base plate 17.

Figure 5:
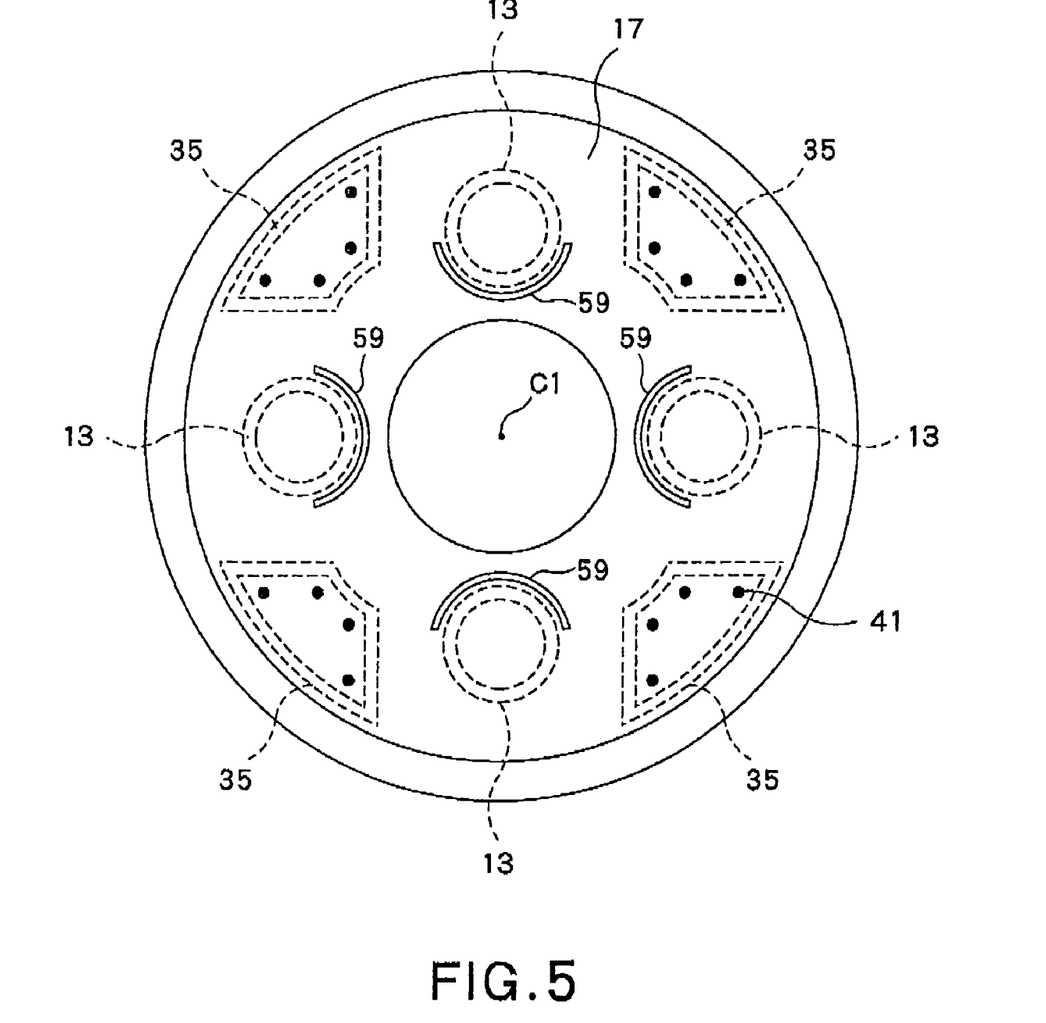
FIG. 5 is a front view of a base plate provided in a planetary reduction gear apparatus according to a second embodiment of the present invention.
Figure 6:
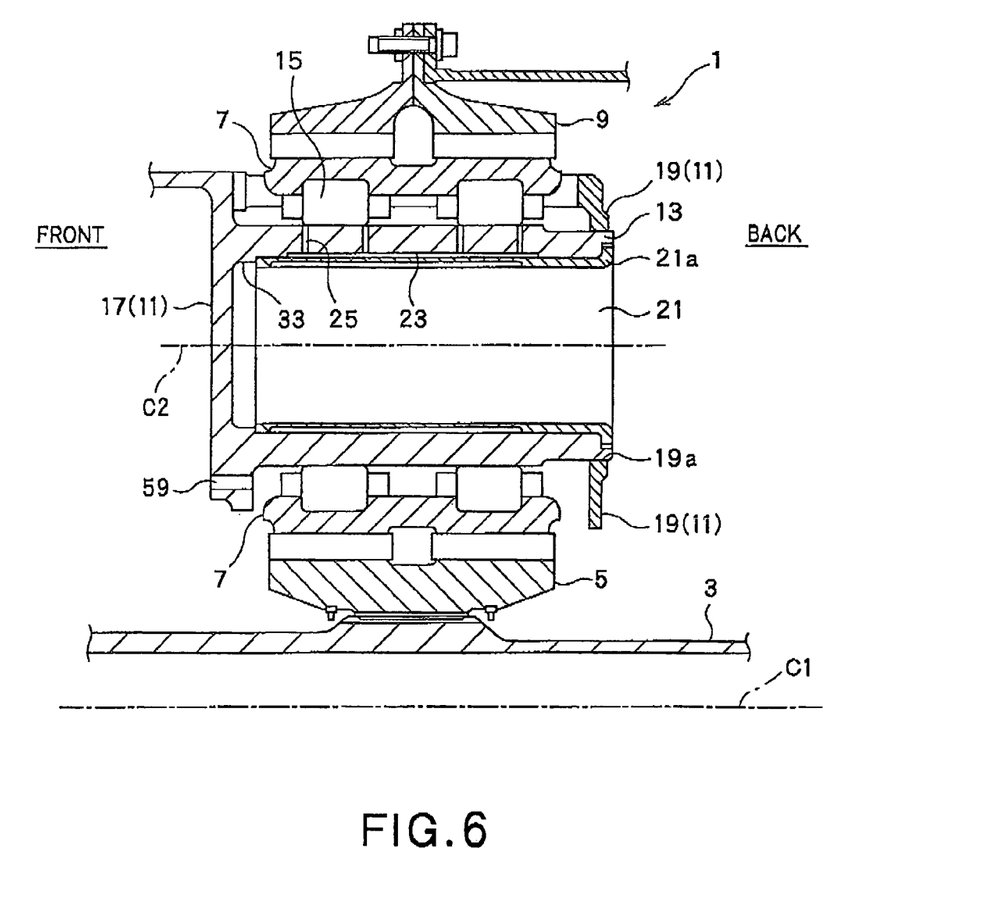
FIG. 6 is a longitudinal section showing a key part of the planetary reduction gear apparatus according to the second embodiment of the present invention.

FIGS. 5 and 6 show the planetary reduction gear apparatus 1 according to a second embodiment of the present invention. While the second embodiment has a similar structure to the first embodiment, the outer through-holes 45, post through-holes 47, inner through-holes 49 and base-plate thin-walled portions 51, as seen in the first embodiment, are not provided in the second embodiment. In addition, the shaft-proximal-end through-hole 53 is not provided at each shaft-proximal-end portion 33. Instead, a slit 59 is provided to the base plate 17, in a position corresponding to an outer circumference of each planetary shaft 13. Each slit 59 is formed into an arcuate hole axially extending through the base plate 17 and provided concentrically with each corresponding planetary shaft 13. Further, the slit 59 is positioned at the side diametrically closer to the axis C1 and extending over approximately a half of the circumference.

In the second embodiment, the same effects as described in the first embodiment can be obtained. Namely, with the provision of each slit 59, i.e., an axially extending through-hole, in a position corresponding to the outer circumference of each planetary shaft 13, the stiffness in the vicinity of each shaftproximal-end portion 33, as shown in the longitudinal section of FIG. 6, can be successfully reduced. As such, the misalignment between each planetary gear 7 and the gear 5 and/or 9 meshed with the planetary gear 7 can be positively reduced, thus improving the life span of the planetary reduction gear apparatus 1. Besides, since such effects can be obtained by only providing the slits 59 in the base plate 17, there is no need for a great change of design and/or undue increase of the production cost.

In the above first and second embodiments, the provision of the through-holes and thin-walled portions to the base plate 17 and/or shaft-proximal-end portions 33 has been described, by way of example, as the structure for reducing the stiffness of the base plate 17 adjacent to the shaft-proximal-end portions 33 and/or each shaft-proximal-end portion 33, respectively located on the output side. However, the shape and arrangement of each through-hole and/or thin-walled portion is not limited to aspects respectively discussed in the first and second embodiments. For instance, any suitable shape and arrangement can be optionally selected for forming each through-hole and/or thin-walled portion in the base plate 17, provided that the stiffness of the base plate 17, especially in the vicinity of each shaft-proximal-end portion 33, can be effectively reduced. Moreover, any other suitable structure than the aforementioned through-hole and/or thin-walled portion can be employed, provided that the stiffness of the base plate 17 and/or each shaft-proximal-end portion 33 can be successfully reduced.

Through careful experiments intended for reducing the stiffness by employing such structures as described above, we found that the misalignment can be effectively reduced, on condition that $R=Y1/Y2$ is set within a range of 0.01 to 0.5 (wherein R is a ratio between the stiffness Y1 in the vicinity of each shaft-proximal-end portion on the output side, i.e., on the side of the base plate 17 and the stiffness Y2 in the vicinity of each shaft-distal-end portion on the opposite side, i.e., on the side of the back plate 19).

Figure 7A:
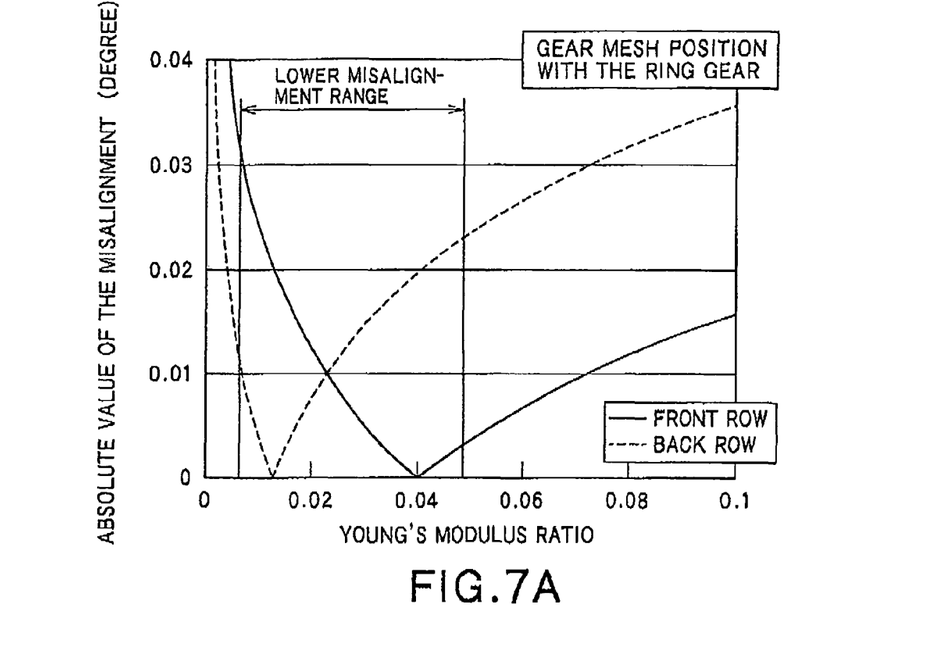
FIGS. 7A and 7B are graphs in which each value of misalignment is plotted relative to a ratio between stiffness on the side of the base plate and stiffness on the side of a back plate.
Figure 7B:
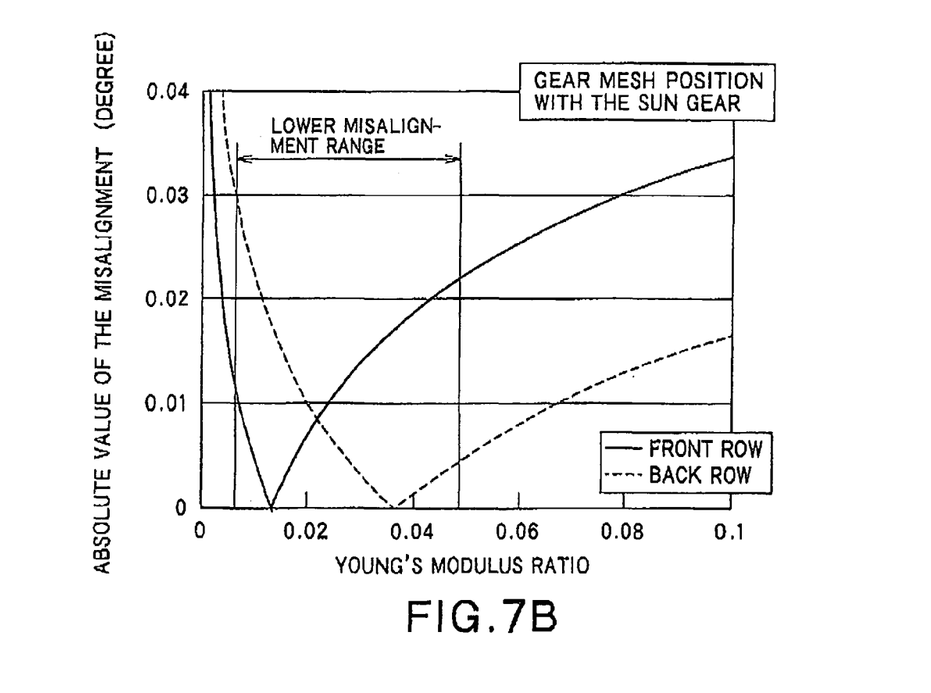

Now, a more preferable range of the stiffness ratio R will be described. FIGS. 7A and 7B are graphs in which each value of misalignment, which is obtained by simulated calculation for each gear in the front and back rows of the plurality of planetary gears 7, is plotted, while the ratio R, between the stiffness Y1 on the base plate side and the stiffness Y2 on the back plate side, is changed within a certain range. More specifically, FIG. 7A shows the value of misalignment in a gear mesh position where each planetary gear 7 is meshed with the ring gear 9. FIG. 7B shows the value of misalignment in another gear mesh position where the planetary gear 7 is meshed with the sun gear 5. The horizontal axis of each graph expresses the ratio R obtained in the case in which each of the stiffness Y1 and Y2 is considered as a Young's modulus, while the vertical axis expresses each value of misalignment as an angle (°). In this case, each angle is expressed as an absolute value that will be zero (0) when the operation is stopped.

Figure 8:
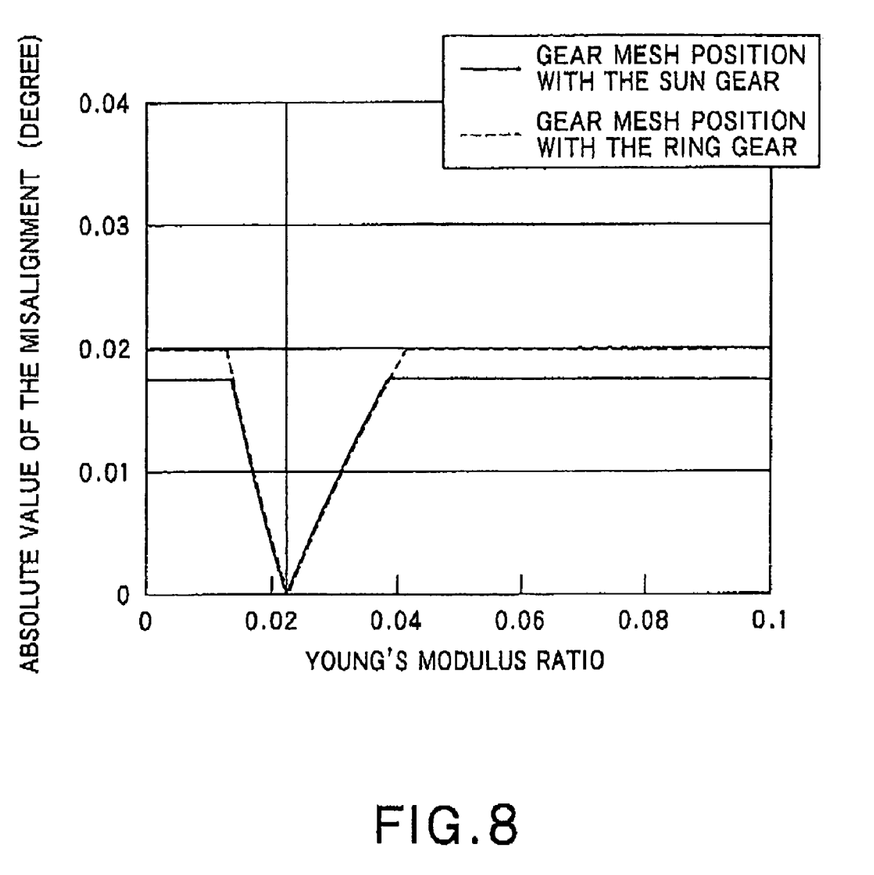
FIG. 8 is a graph in which each absolute value of a difference in the misalignment between a front row and a back row is plotted.

Namely, in FIGS. 7A and 7B, a part corresponding to an actually negative value of the misalignment (or left part of each drawing), which would be obtained if an actual direction is considered in the above calculation, is expressed as a positive value in appearance; i.e., as a reflection over the horizontal axis (on which the misalignment=0). FIG. 8 is another graph, in which each difference, between the absolute values of misalignment between the front and back rows respectively shown in FIGS. 7A and 7B, is plotted.

As shown in each graph of FIGS. 7A and 7B, the stiffness on the side of the base plate 17 relative to the stiffness on the side of the back plate 19 will be lowered, as one goes from right to left in the graph, i.e., as the Young's modulus ratio R is decreased. As is seen from FIGS. 7A and 7B with the decrease of the value of R, or as the stiffness on the side of the base plate 17 is lowered relative to the stiffness on the side of the back plate 19, the value of misalignment will be decreased in either gear meshed position of the front and rear rows. However, if the stiffness on the side of the base plate 17 is unduly decreased, the misalignment will be increased in a reverse direction as depicted in the graph.

In FIG. 8, if the value on the vertical axis, i.e., the difference between the absolute values of misalignment between the front and back rows, is zero, the degrees of misalignment in the front and back rows are equal to each other, resulting in a uniform gear mesh state in both of the front and rear rows. Accordingly, from the results shown in FIGS. 7A, 7B and 8, it can be seen that the range of the ratio R, between the stiffness Y1 in the vicinity of the shaft-proximal-end portion and the stiffness Y2 in the vicinity of the shaft-distal-end portion on the opposite back-plate side, is preferably 0.01 to 0.05, more preferably 0.015 to 0.04.

While the preferred embodiments have been described with reference to the drawings, various additions, modifications and/or deletions can be made thereto, without departing from the spirit and scope of the present invention. In this case, all of such additions, modifications and/or deletions should be construed to fall within the scope of this invention.

The invention claimed is:

1. A planetary reduction gear apparatus comprising:
   a sun gear having external teeth;
   a plurality of planetary gears, each of the planetary gears having external teeth and being configured to be meshed with the sun gear;
   a plurality of planetary shafts, each of the planetary shafts being a rotation shaft of each of the planetary gears;
   a ring gear having internal teeth and configured to be meshed with the planetary gears;
   a planetary carrier including an annular base plate and an annular back plate, the planetary carrier being configured to support the planetary shafts between the annular base plate and the annular back plate and determine a relative position between planetary gears, the annular base plate being integrally formed with one end of the planetary shaft so as to support the one end, the annular back plate being configured to support an other end of the planetary shaft; and
   an axially extending carrier post coupling the annular base plate with the annular back plate,
   wherein the annular base plate is coupled with an output shaft, and has a lower stiffness in its part adjacent to the one end of the planetary shaft than a stiffness of a part of the annular back plate adjacent to the other end of the planetary shaft,
   wherein an amount of material in the part of the annular base plate adjacent to the one end of the planetary shaft is reduced, and
   wherein an axially extending through-hole is formed in the annular base plate.

2. The planetary reduction gear apparatus according to claim 1, wherein the axially extending through-hole is formed in a portion of the annular base plate inner with respect to a portion corresponding to the carrier post in a diametrical direction of the annular base plate.

3. The planetary reduction gear apparatus according to claim 1, wherein the axially extending through-hole is formed as an arcuate hole concentrically with the planetary shaft, in a portion of the annular base plate inner with respect to a portion corresponding to the planetary shaft in a diametrical direction of the annular base plate.

4. The planetary reduction gear apparatus according to claim 1, wherein the axially extending through-hole is formed in a portion of the annular base plate outer with respect to a portion corresponding to the planetary shaft in a diametrical direction of the annular base plate.

5. The planetary reduction gear apparatus according to claim 1, wherein the carrier post is hollow, and the axially extending through-hole is formed in a portion of the annular base plate facing a hollow portion of the carrier post.

6. The planetary reduction gear apparatus according to claim 1, wherein a thin-walled portion is provided, as lattice grooves, on the annular base plate.

7. The planetary reduction gear apparatus according to claim 1, wherein the carrier post has a lateral section in a shape of a trapezoid.

\* \* \* \* \*